July 5, 1938.    S. PASTOR    2,122,487
INSECT TRAP
Filed Oct. 17, 1935
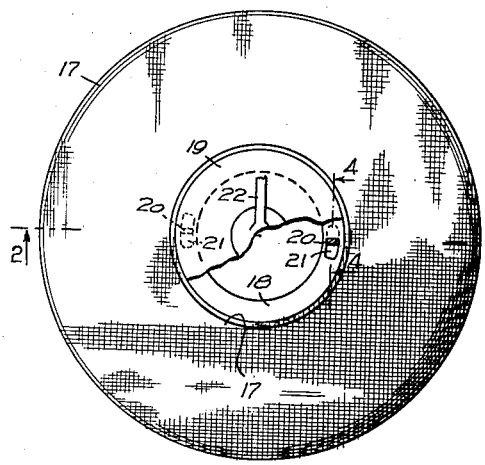
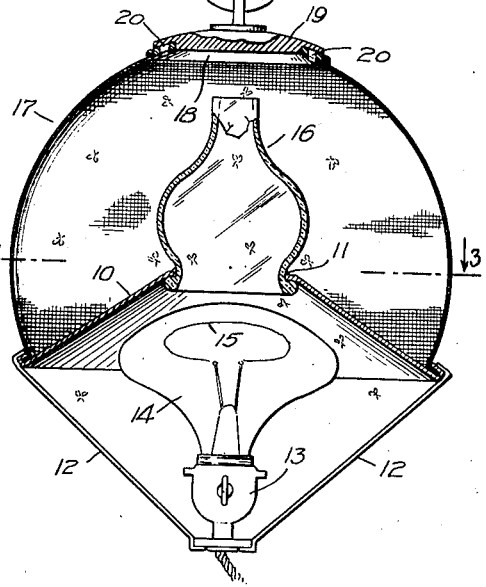
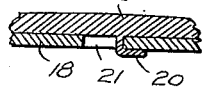
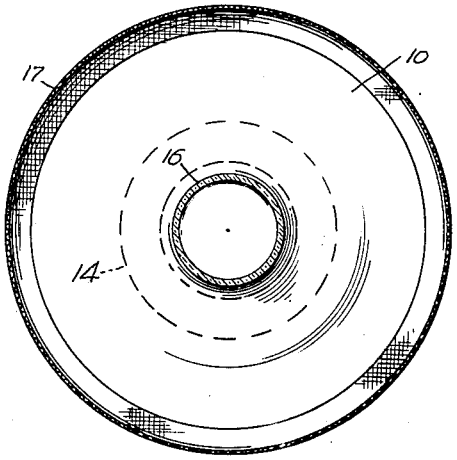
Santos Pastor
INVENTOR
BY
his ATTORNEY

UNITED STATES PATENT OFFICE 2,122,487

INSECT TRAP

Santos Pastor, New York, N. Y.

Application October 17, 1935, Serial No. 45,378

3 Claims. (Cl. 43—113)

This invention relates generally to an insect trap and has reference particularly to a type of trap utilizing an electric light to lure the insects into a cage in which they may be destroyed.

Traps of this type are especially effective for capturing night flying insects, such as moths and mosquitoes, which are attracted by light and which concentrate in great swarms in any well lighted area.

The present invention has for its object to provide an insect trap of the character hereinafter described, which is readily installed, inexpensive to manufacture and extremely effective in operation.

More particularly this invention provides a trap having an inwardly and upwardly tapering throat arranged immediately above the lamp, so as to make use of the light as well as of the heat from the latter to attract the insects, then lure them into the upward current of air traversing the tapering throat and finally discharging them into a cage forming part of the trap.

The attraction that light has for certain species of insects is well known and suffice it to say that the more powerful the light and the wider the area illuminated thereby, the greater the number of insects that may be attracted and captured. Heretofore, oil lamps have been equipped with traps for the purpose of destroying the insects, but the power of the light in these instances is very small and not particularly effective. According to the present invention a powerful electric bulb is spaced below a reflector surface which, in deflecting the light rays, causes them to emit a defused light which is unusually brilliant and effective in attracting the insects from over very wide areas.

According to the present construction, the insect is attracted to the uppermost part of the incandescent electric light bulb, because of the particular arrangement of the circular filament at this point and due to the disposition of the reflector with respect to the bulb filament, the insects fly towards this circle of intense light in order to enjoy to the fullest extent the sensation created thereby. It is to be noted that once the insect, and particularly the mosquito, has basked in the light for a certain period his desires seem to be satisfied, while in the meantime he has reached the opening above the bulb leading through the tapered passage into the cage. His desires having turned to a means of escape, he allows himself to be drawn upwardly by the current of heated air from the lamp into the glass funnel or chimney above the reflector. The glass chimney opens into a wire mesh cage mounted on the upper walls or outer surface of the reflector. The glow from the bulb will more or less follow upwardly into the chimney, so that once the insect has entered the cage, the tendency will be for him to again gravitate towards the light which will be greater at the lower end of the chimney where he will be farthest from a possible exit.

It has been found in practice that the insects will concentrate about the base of the chimney until they become exhausted and finally die. Those vigorous enough to survive this ordeal will soon be overcome by their natural tendency towards self preservation which leads to attack upon other survivors and final defeat as fresh reinforcements are constantly arriving by the way of the chimney.

Insects and particularly mosquitoes are repulsed by intense heat or moving objects and in constructing the present invention care has been exercised to allow sufficient space between the walls of the bulb and reflector to create a flow of air therebetween which keeps the path followed by the insects into the chimney fairly cool. Likewise the insect trap, according to the present invention, lends itself well to being rigidly supported and thus will not repulse such insects as may otherwise be driven away.

One embodiment of my invention is described in the specification, set forth in the claims and illustratively exemplified in the accompanying drawing, in which:

Figure 1 is a top plan view of my improved trap showing parts broken away.

Figure 2 is a substantially longitudinal sectional view of the trap taken on lines 2—2 of Figure 1.

Figure 3 is a substantially transverse sectional view taken on lines 3—3 of Figure 2; and Figure 4 is a sectional view taken on lines 4—4 of Figure 1.

Referring to the drawing, 10 denotes a reflector shade of substantially frusto-conical shape having its under surface highly polished to increase the reflection of light rays brought into proximity thereto and consequently to discourage the insects remaining at the mouth of the opening 11 at the top of the shade. Supported on the peripheral edge of the shade 10 is a depending bracket comprising converging rods 12 and a lamp socket 13. An electric bulb 14 is mounted in upright position in the socket 13 and consists of a mushroom shaped top enclosing a circular filament 15. The widest part of the bulb is spaced from the adjacent reflecting surface of the shade to provide a circular passage of intense diffused light.

An upright glass funnel or lamp chimney 16 is mounted in the opening 11 of the shade and provides a passage, which is partly illuminated, and which affords an escape for the insects to a confined space or cage 17 above the shade 10.

The cage 17, in the present instance, comprises a hemispherically shaped wire mesh container attached at its open side to the upper side of reflector shade 10 at the periphery thereof. The dimensions of the cage are such that the top of the lamp chimney is spaced short of its top, which consists of an opening formed by a ring 18 and a removable plate 19 interlocking therewith. The means of interlocking the ring and plate comprises depending angular tabs 20 which project through slots 21 in the ring and which when turned in one direction the latter project under the ring beyond the slots and hold the two members together and when turned in the reverse direction mesh with the slots and may be withdrawn to separate the ring from the plate.

The plate 19 is provided with a wall bracket 22 so that when the trap is to be detached, it is simply necessary to turn the entire device and free it of the tabs 20. The removal of the plate 19 leaves the opening in the cage free to discharge the contents thereof, an operation requiring the trap to be inverted so as to allow the dead insects to fall outwardly through the opening.

Having described my invention, what I claim and desire to secure by Letters Patent is:

1. An insect trap comprising a closed wire mesh cage, a bottom element for said cage shaped like the convex surface of a conical frustrum, having open bases and projecting into said cage, a support for an incandescent lamp, said support being positioned entirely below the smaller base of the frusto-conical element, an electric incandescent lamp mounted on said support in upright position and having the top thereof below the smaller base of the conical frustum, and a chimney tube having its lower end secured to the smaller base of the conical frustum and its upper end projected into said cage to a point short of the top thereof, whereby an intense air suction is obtained from the top of the incandescent lamp into the cage.

2. An insect trap, as claimed in claim 1, in which said incandescent lamp comprises a mushroom shaped top having a diameter greater than that of the smaller base of the frusto-conical element, the plane of said diameter being above the larger base of the frusto-conical element.

3. An insect trap having a cage of dome-shaped substantially semi-spherical formation, a bottom element of frusto-conical form projecting into said cage, the latter having its base supported on the larger base of the frusto-conical element, a support for a lamp positioned entirely beneath said case and frusto-conical element, a lamp positioned completely under the lower surface of the frusto-conical element, and a chimney positioned directly above the lamp and mounted within a smaller base portion of the frusto-conical element, the axes of the cage, chimney and lamp being in alignment, said frusto-conical element having a lower surface of light-reflecting material.

SANTOS PASTOR.